United States Patent
Callaghan

(10) Patent No.: US 10,467,416 B2
(45) Date of Patent: Nov. 5, 2019

(54) SECURING OPERATING SYSTEM CONFIGURATION USING HARDWARE

(71) Applicant: International Business Machines Corporation, Armonk, NY (US)

(72) Inventor: Patrick J. Callaghan, Vestal, NY (US)

(73) Assignee: International Business Machines Corporation, Armonk, NY (US)

(*) Notice: Subject to any disclaimer, the term of this patent is extended or adjusted under 35 U.S.C. 154(b) by 315 days.

(21) Appl. No.: 15/624,970

(22) Filed: Jun. 16, 2017

(65) Prior Publication Data

US 2018/0365426 A1 Dec. 20, 2018

(51) Int. Cl.
*G06F 21/00* (2013.01)
*G06F 21/57* (2013.01)
(Continued)

(52) U.S. Cl.
CPC .......... *G06F 21/575* (2013.01); *G06F 9/4401* (2013.01); *G06F 9/4406* (2013.01);
(Continued)

(58) Field of Classification Search
CPC .... G06F 21/575; G06F 9/4401; G06F 9/4406; G06F 21/6218; G06F 21/44; G06F 9/441;
(Continued)

(56) References Cited

U.S. PATENT DOCUMENTS 6,961,941 B1 11/2005 Nelson
7,996,684 B2 8/2011 Wasson et al.
(Continued)

FOREIGN PATENT DOCUMENTS

| CN | 1813229 A | 8/2006 | |
|---|---|---|---|
| CN | 103294499 A | 9/2013 | |
| WO | WO-2007098642 A1 * | 9/2007 | ........... G06F 9/4401 |

OTHER PUBLICATIONS

Anonymous, "Method and System for Managing Configuration of a Hardware Device in a Collaborative Environment", An IP.com Prior Art Database Technical Disclosure, Sep. 22, 2011, 2 pages http://ip.com/IPCOM/000211146D.
(Continued)

*Primary Examiner* — Christopher C Harris
(74) *Attorney, Agent, or Firm* — Jay Wahlquist

(57) ABSTRACT

A method, system, and computer program product includes receiving, in a booted state of a computing system, a request to load an operating system configuration. The method further includes storing, automatically in response to receiving the request, a digital key to authenticate the operating system configuration. The method further includes restarting the computing system. In response to restarting the computing system and while the computing system is in a pre-boot state, the method includes: validating that the digital key stored is one for a valid operating system configuration; receiving, from a user interface physically coupled to the computing system, a signal confirming the received request; authenticating, in response to receiving the signal, the operating system configuration using the digital key; and booting, in response to the authenticating, the operating system configuration.

20 Claims, 6 Drawing Sheets

(51) Int. Cl.
*G06F 9/4401* (2018.01)
*G06F 21/44* (2013.01)
*G06F 21/62* (2013.01)
*H04L 9/32* (2006.01)
*H04L 9/08* (2006.01)
*H04L 9/14* (2006.01)

(52) U.S. Cl.
CPC .......... *G06F 21/44* (2013.01); *G06F 21/6218* (2013.01); *H04L 9/0891* (2013.01); *H04L 9/3247* (2013.01); *G06F 9/441* (2013.01); *G06F 2221/034* (2013.01); *H04L 9/14* (2013.01)

(58) Field of Classification Search
CPC ............. G06F 2221/034; H04L 9/0891; H04L 9/3247; H04L 9/14
See application file for complete search history.

(56) References Cited

U.S. PATENT DOCUMENTS

| | | | |
|---|---|---|---|
| 8,904,190 B2 | 12/2014 | Wong | |
| 8,966,657 B2 | 2/2015 | Martinez et al. | |
| 2002/0073201 A1* | 6/2002 | French | G06F 9/441 709/227 |
| 2003/0115443 A1* | 6/2003 | Cepulis | G06F 9/4406 713/2 |
| 2004/0103299 A1* | 5/2004 | Zimmer | G06F 21/57 726/26 |
| 2006/0184794 A1* | 8/2006 | Desselle | G06F 21/575 713/166 |
| 2008/0244257 A1* | 10/2008 | Vaid | H04L 9/0827 713/2 |
| 2009/0249066 A1* | 10/2009 | Lu | G06F 21/445 713/164 |
| 2010/0287363 A1* | 11/2010 | Thorsen | G06F 21/575 713/2 |
| 2011/0078429 A1* | 3/2011 | Yang | G06F 9/441 713/2 |
| 2012/0185683 A1* | 7/2012 | Krstic | G06F 21/44 713/2 |
| 2012/0226895 A1* | 9/2012 | Anderson | G06F 21/575 713/2 |
| 2013/0024677 A1* | 1/2013 | Smith | G06F 21/57 713/1 |
| 2014/0380031 A1* | 12/2014 | Jones | G06F 21/572 713/2 |
| 2015/0019850 A1* | 1/2015 | Rivera | G06F 21/572 713/1 |
| 2015/0378744 A1* | 12/2015 | Gschwind | G06F 9/441 713/2 |
| 2016/0125187 A1* | 5/2016 | Oxford | G06F 21/575 713/2 |
| 2018/0006815 A1* | 1/2018 | Young | G06F 12/1408 |
| 2018/0032734 A1* | 2/2018 | Gunti | G06F 21/575 |

OTHER PUBLICATIONS

Anonymous, "Method and Apparatus for Physical Presence Assertion through Visual Verification", An IP.com Prior Art Database Technical Disclosure, Jun. 19, 2014, 4 pages http://ip.com/IPCOM/000237527D.

Miller, "Hardware Reference Architecture: Direct Attached Storage", MarkLogic, Jun. 2016, 15 pages MarkLogic.com/performanceengineering.

Wilkins, et al., "UEFI Secure Boot in Modern Computer Security Solutions," Sep. 2013, 10 pages http://www.uefi.org/sites/default/files/resources/UEFI_Secure_Boot_in_Modern_Computer_Security_Solutions_2013.pdf.

Callaghan, "Securing Operating System Configuration Using Hardware," U.S. Appl. No. 15/801,543, filed Nov. 2, 2017.

List of IBM Patents or Patent Applications Treated as Related, Dated Oct. 29, 2017, 2 pages.

International Search Report and Written Opinion, International Application No. PCT/IB2018/054226, International Filing Date Jun. 12, 2018.

* cited by examiner

SECURING OPERATING SYSTEM CONFIGURATION USING HARDWARE

BACKGROUND

The present disclosure relates to computing systems that employ secure boot of operating systems. More specifically, the present disclosure relates to securing an operating system configuration of computing systems using hardware.

Computing systems have access control policies that can limit the access users have to filesystem objects. An access control policy, for example, can restrict the files a user can modify, or they can prohibit a user from loading a given operating system module. Access control policies can be enforced by the configuration of an operating system executing on a computing system. An operating system configuration, in turn, can be determined by setting kernel parameters corresponding with a given configuration of an operating system kernel before using the kernel to boot a computing system into a state suitable for executing user applications. Once a computing system is booted using a given operating system configuration, the access control policy enforced by the configuration can remain in effect until the computing system is booted under a different operating system configuration, if permitted by the computing system.

Some computing systems enable users to choose from amongst a set of different operating system configurations. A user with a valid account on these computing systems can change an access control policy (or the enforcement of an access control policy) of a computing system by selecting and booting an operating system configuration having a different access control policy that the configuration currently being booted.

It is common for users to remotely access computing systems using account credentials (e.g., a username and password). Users accessing a computing system remotely are usually subject to the same access control policies as users accessing the computing system from a local terminal. Authorized users of a computing system, consequentially, can remotely change the access control policy of the computing system using the process previously described. One artifact of this regime, however, is that unauthorized users who are able to obtain the access credentials of an authorized user to a computing system can also remotely change the access control policy of the computing system, possibly elevating their access privileges on the computing system.

In view of the foregoing, there is a need for techniques to enable a user of a computing system to choose from amongst a set of different operating system configurations and have assurance that the chosen configuration has not been modified, changed or otherwise tampered with before the chosen configuration is booted on the computing system.

SUMMARY

Embodiments of this disclosure include methods, systems, and computer program products that enable a user of a computing system to choose from amongst a set of different operating system configurations and have assurance that the chosen configuration has not been modified, changed or otherwise tampered with before the chosen configuration is booted on the computing system. The embodiments disclosed herein provide advantages in the security, flexibility of access, and management of computing systems.

According to embodiments of the present disclosure, a method includes receiving, in a booted state of a computing system, a request to load an operating system configuration. The method further includes storing, automatically in response to receiving the request, a digital key to authenticate the operating system configuration. The method further includes restarting the computing system. In response to restarting the computing system and while the computing system is in a pre-boot state, the method includes: validating that the digital key stored is one for a valid operating system configuration; receiving, from a user interface physically coupled to the computing system, a signal confirming the received request; authenticating, in response to receiving the signal, the operating system configuration using the digital key; and booting, in response to the authenticating, the operating system configuration.

According to various embodiments of the present disclosure, a system includes a user interface terminal, a computing system physically coupled to the user interface terminal and having a memory, a processor, and computer readable storage medium having program instructions embodied therewith. The program instructions are executable by the processor to cause the system to receive, in a booted state of the computing system, a request to load an operating system configuration. The program instructions are further executable by the processor to cause the system to store, automatically in response to receiving the request, a digital key to authenticate the operating system configuration. The computing system is then restarted.

In response to restarting the computing system and while the computing system is in a pre-boot state, the program instructions are further executable by the processor to cause the system to: validate that the digital key stored is one for a valid operating system configuration; receive, from a user interface physically coupled to the computing system, a signal confirming the received request; authenticate, in response to receiving the signal, the operating system configuration using the digital key; and boot, in response to the authenticating, the operating system configuration.

Various embodiments are directed to a computer program product for securely booting a computing system. The computer program product includes a computer readable storage medium having program instructions embodied therewith, where the computer readable storage medium is not a transitory signal, and the program instructions executable by a processor to cause the computing system to perform a method including receiving, in a booted state of the computing system, a request to load an operating system configuration. The method further includes storing, automatically in response to receiving the request, a digital key to authenticate the operating system configuration. The method then includes restarting the computing system.

In response to restarting the computing system and while the computing system is in a pre-boot state, the method additionally include: validating that the digital key stored is one for a valid operating system configuration; receiving, from a user interface physically coupled to the computing system, a signal confirming the received request; authenticating, in response to receiving the signal, the operating system configuration using the digital key; and booting, in response to the authenticating, the operating system configuration.

According to alternative embodiments of the present disclosure, a method includes receiving, from a user application executing under a first operating system configuration on a computing device, a request to execute a second operating system configuration of a set of operating system configurations. The second operating system configuration is signed by a private key of a public-private key pair, and comprises at least an operating system kernel compiled with a set of parameters associated with an access control policy of the second operating system configuration. The method additionally includes storing, in response to receiving the request, a public key corresponding to the private key in a nonvolatile memory of the computing device. The method further includes executing a trusted application during a pre-boot state of the computing device to: validate that the public key stored in nonvolatile memory is one for a valid operating system configuration; receive, from a local interface to the computing device, a signal confirming the received request; move the public key to a protected memory when the signal confirms the request; and execute a boot loader having access to the protected memory to authenticate the second operating system using public key stored in the protected memory, and to boot the second operating system configuration in response to the authenticating.

According to alternative embodiments of the present disclosure, a system includes a user interface terminal, a computing system physically coupled to the user interface terminal and having a memory, a processor, and a computer readable storage medium having program instructions embodied therewith. The program instructions are executable by the processor to cause the system to receive, from a user application executing under a first operating system configuration on a computing device, a request to execute a second operating system configuration of a set of operating system configurations. The second operating system configuration is signed by a private key of a public-private key pair, and comprises at least an operating system kernel compiled with a set of parameters associated with an access control policy of the second operating system configuration.

The program instructions are further executable by the processor to cause the system to store, in response to receiving the request, a public key corresponding to the private key in a nonvolatile memory of the computing device. The program instructions are additionally executable by the processor to cause the system to execute a trusted application during a pre-boot state of the computing device to: validate that the public key stored in non-volatile memory is one for a valid operating system configuration; receive, from the user interface terminal, a signal confirming the received request; move the public key to a protected memory when the signal confirms the request; and execute a boot loader having access to the protected memory to authenticate the second operating system using public key stored in the protected memory, and to boot the second operating system configuration in response to the authenticating.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
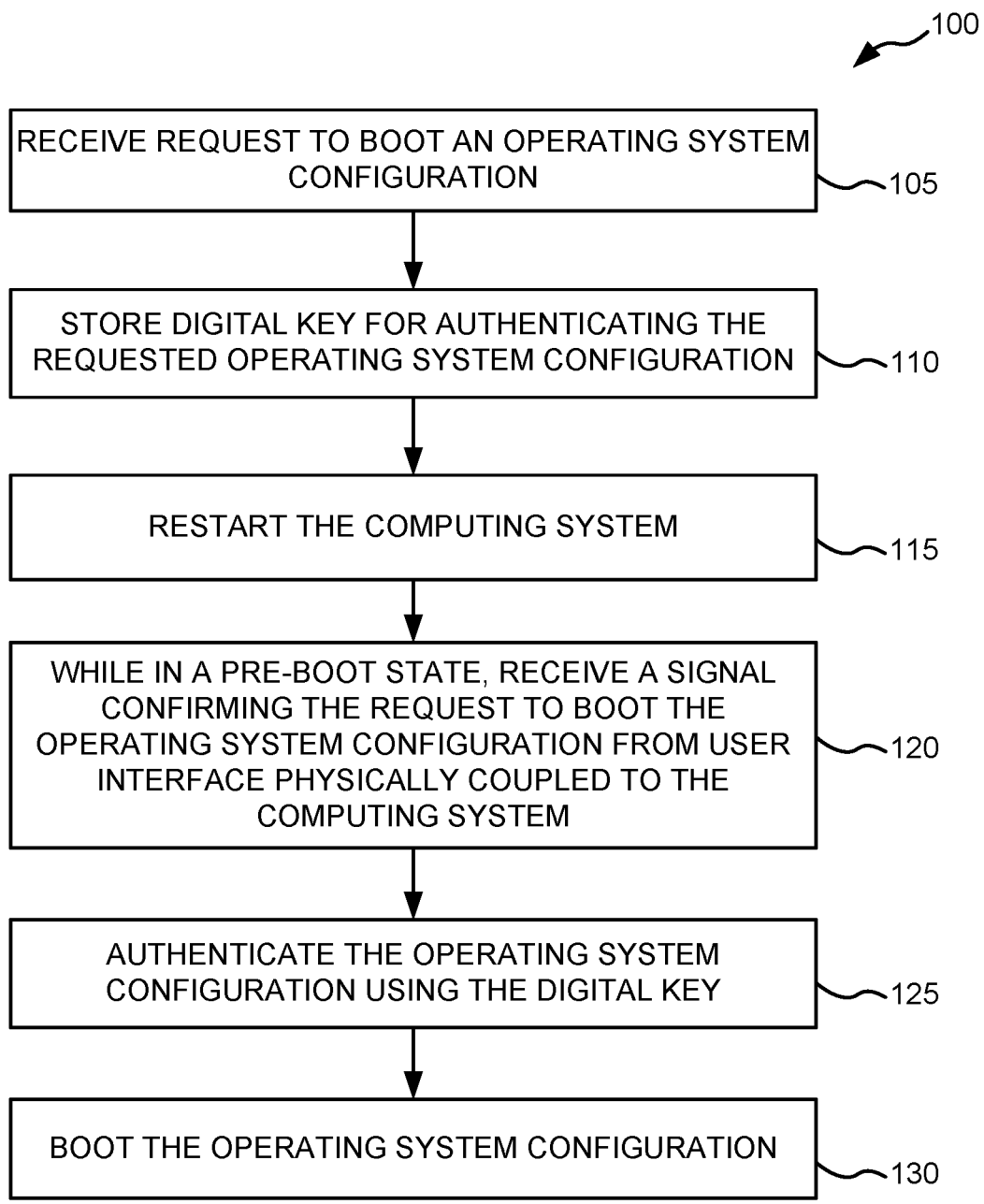
FIG. 1 depicts a flowchart of a set of computer implemented operations for securely booting an operating system configuration selected from a set of operating system configurations using hardware and software, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computing systems that employ secure boot of operating systems, more particular aspects relate to securing an operating system configuration of computing systems before booting using hardware. While the present disclosure is not necessarily limited to such applications, various aspects of the disclosure can be appreciated through a discussion of various examples using this context.

Embodiments of the present disclosure include methods, systems, and computer program products that can enable a user of a computing system to choose from amongst a set of different operating system configurations and have assurance that the chosen configuration has not been modified, changed or otherwise tampered with before being booted on the computing system. The embodiments disclosed herein provide advantages in the security, flexibility of access, and management of computing systems.

Embodiments of the present disclosure are based on the recognition that secure boot techniques can be extended or otherwise augmented using the techniques described herein to ensure, inter alia, the authenticity of an operating system configuration, selected from a set of operating system configurations stored on a computing system, in a pre-boot environment. Secure boot techniques, such as the Unified Extensible Firmware Interface Secure Boot (hereinafter, "UEFI Secure Boot"), enhance the security of computing systems in the pre-boot environment by preventing the execution of unprotected computer executable code (hereinafter, "code") before booting an operating system. In one example, a secure booting technique stores a set (e.g., one or more) of public keys of a set asymmetric key pairs (e.g., a public-private key pairs) in a set of variables in a protected nonvolatile memory of a computing system during the manufacturing of the computing system. Each application (e.g., computer program) that is approved (or authorized) to execute on the computing system is signed using a private key having a corresponding public key in the stored set of public keys. Before executing an application while a computing system is in a pre-boot state, a trusted application verifies the executable code integrity of the application to be executed by verifying that the application is digitally signed with a private key corresponding to one of the public keys in the stored set of public keys. One problem with this secure boot technique is that the set of authorized signers (or the set of private keys) are determined prior to, or contemporaneously with, the manufacture of the computing system. Enabling a new operating system to securely but the computing system, for example, can require having one of a set of predetermined authorized signers digitally sign the operating system before deploying it to the computing system.

The secure boot techniques can provide a set of trusted applications to enable end users to add additional public keys to authenticate applications that can be booted onto a computing system. UEFI Secure Boot, for example, provides the "mokutil", "shim" and "grub" applications to enable users to add public keys to the set of public keys provided during manufacturing. A user logged into an operating system booted on a computing system to which a new public key (e.g., corresponding to a new operating system kernel image to be added to the computing system) will be added executes mokutil to provide the new public key. The mokutil application writes the new public key to a nonvolatile memory that can be accessed only by the shim the next time the computing system is booted. The shim application can be a trusted application embedded in, for example, a protected memory of the computing system. Additionally, the computing system can be configured to ensure that shim is the first application executed after the computing system is restarted. The next time the computing system is restarted, following an update by mokutil, the UEFI Secure Boot system verifies and executes the shim application. The shim application then reads an area of nonvolatile memory written by mokutil to determine whether a new public key was stored. Shim, in response to detecting the new public key, can prompt the user, at a local console to confirm whether the new public key should be committed to a set or database of stored public keys. Shim erases (or deletes) the new public key if the user does not provide a positive confirmation. Alternatively, shim moves the new public key to another area of nonvolatile memory (e.g., a database storing all the accepted public keys) used exclusively by grub, via calls to the shim application, when the user provides a positive confirmation. The new public key is thereafter available to authenticate the new kernel image.

To securely boot an operating system kernel, shim authenticates and executes grub after committing any new keys to a computing system. Grub uses its configuration files to determine which kernel image to boot. After identifying an operating system kernel to boot, grub authenticates and boots the kernel image by calling the shim application to verify that the kernel image is signed by a private key corresponding to one of the public keys stored in a public key database of the computing system. Once booted, the operating system kernel can similarly authenticate kernel modules as they are requested to be loaded on the computing system.

These secure boot techniques can enable a user to load a new operating system on a computing system provided the user has access to a properly signed version of the operating system and maintains a public key corresponding to a private key used to sign the operating system. Known secure booting techniques, however, do not enable users to select an operating system configuration, from a set of operating system configurations stored on the computing system, to boot on a computing system. Furthermore, known secure booting techniques do not enable the computing system to ensure that the selected operating system configuration is booted without being modified or otherwise tampered with.

Embodiments of the present disclosure provide methods, systems, and a computer program products that improve upon known secure boot techniques by receiving a request to boot an operating system configuration from a set of operating system configurations digitally signed by a private key of an asymmetric key pair and stored on a system, automatically providing a public key of the asymmetric key pair to a trusted application configured to update a protected database of public keys, verifying the request to load the operating system configuration using the user's physical presence at the computing system, and authenticating and booting the operating system configuration.

As used herein, a trusted application is an application whose executable code is authenticated or otherwise guaranteed to be unaltered by a party without authorization to alter the code. Executable code can be authenticated using known digital signing and verification techniques. Executable code, for example, can be signed by encrypting the code using a private key of an asymmetric key pair. The integrity of the code can then be authenticated by using a public key of asymmetric key pair to verify a signature of the signed code. The authentication fails when the signature of the signed code cannot be verified due to, for example, a change to the signed code after the signing.

As used herein, a key database can be an area of protected memory configured to store a set of digital keys (e.g., public keys of an asymmetric key pair). The protected memory can be a memory accessible (e.g., readable or writeable) only to trusted applications or a selected group of applications.

As used herein, a pre-boot state of computing system can be a state of the computing system after the computing system restarts and before the computing system boots an operating system. A booted state of an operating system is a state of a computing system after an operating system is booted on the computing system.

As used herein, an operating system configuration can be a data object having a bootable operating system kernel image (hereinafter, "operating system kernel" or "kernel") and an associated set of one or more kernel parameter values (e.g., parameter values). In some embodiments, the kernel parameters values can be hardcoded (e.g., compiled into the executable code of the operating system kernel) fixed command line parameter values. Hardcoding the kernel parameter values can include providing the parameter values to a compiler using one or more compiler options when the operating system kernel is compiled. Hardcoding the kernel parameter values can additionally include compiling the operating system kernel using compile options to prevent a bootloader or other application from overriding the hardcoded kernel parameter values. In certain embodiments, the kernel parameter values can be provided in a data object separate from the operating system kernel.

A data object, as used herein, can be a single kernel image. A data object can also be a data structure having an operating system kernel and a set of additional data objects. Signing the operating system can include signing the data object and/or each component of the data object.

Booting an operating system configuration, on a computing system, where kernel parameters are hardcoded can include passing the operating system kernel to a bootloader and causing the bootloader to load and execute the operating system kernel on the computing system. Similarly, booting an operating system configuration where one or more kernel parameter value is stored in a data object separate from the operating system kernel can include passing both the operating system kernel and the one or more kernel parameter values to a bootloader and causing the bootloader to load and execute the operating system kernel with the one or more kernel parameter values.

For a given operating system kernel, an operating system configuration can be characterized by its enforcement of access control policies. This can be referred to as the security level of a configuration. A computing system, for example, can have a distribution of a Linux® kernel installed along with, inter alia, a Security Enhanced Linux (SELinux) module for enforcing access control polices. Continuing with the example, the computing system can also be configured to support three types of operating system configurations (e.g., security levels): low, medium, and high. A Linux kernel booted using the low configuration can disable SELinux and prevent enforcement of an access control policy, while a Linux kernel booted using the medium configuration can enable the SELinux in a permissive or debug mode to monitor, but not enforce, an access control policy. Additionally, a Linux kernel booted using the high configuration can enable SELinux in an enforcement mode to enforce a mandatory access control policy while the computing system is booted. This example computing system can thus support three distinct operating system configurations, with each configuration having a Linux kernel and associated SELinux module, for example, compiled with kernel parameter values set to enable a specific access policy enforcement, or security, level.

Figure 6:
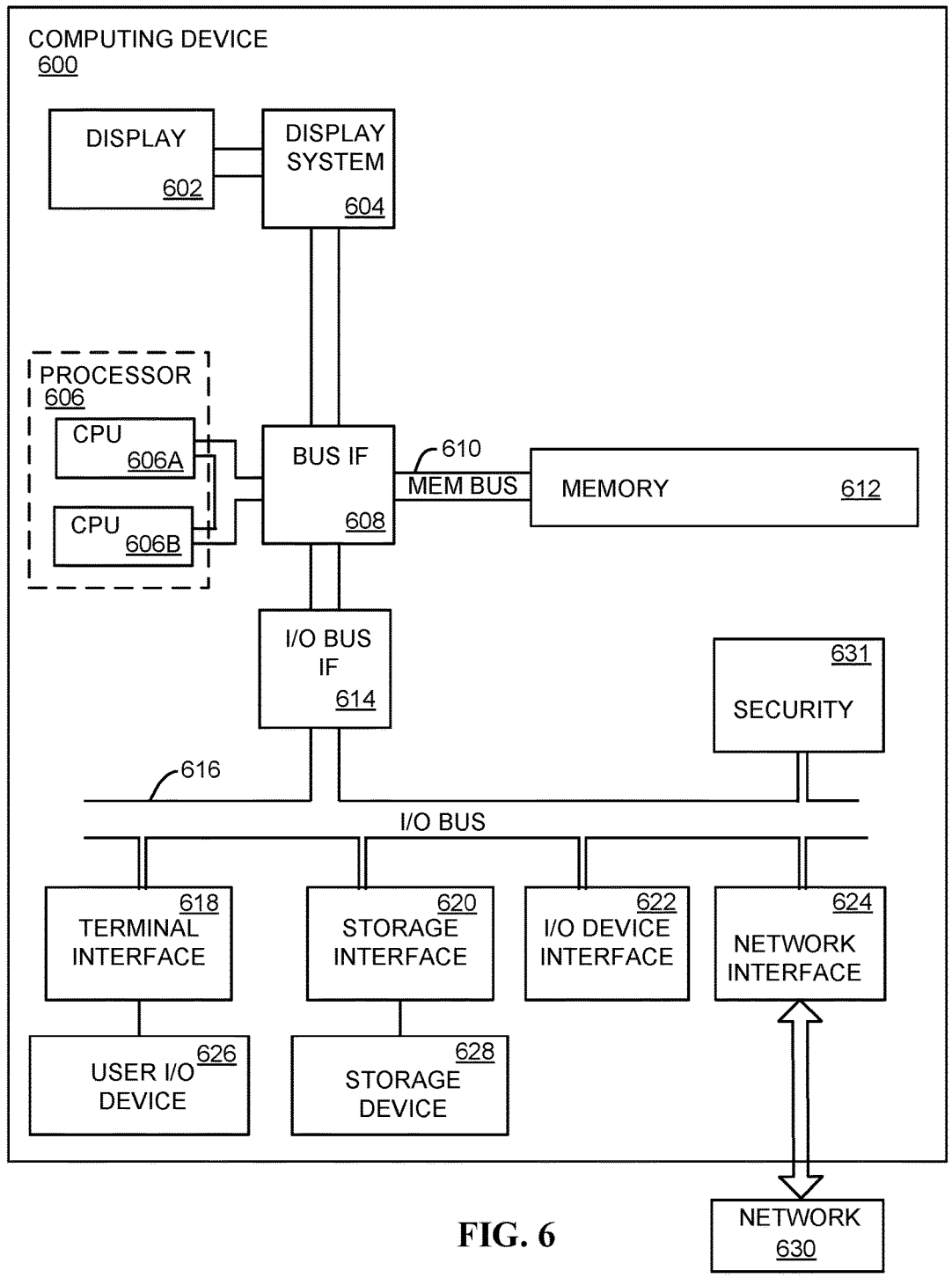
FIG. 6 depicts a block diagram of a computer system having hardware and software components for securely booting an operating system configuration selected from a set of operating system configurations using hardware and software, according to various embodiments.

Referring now to the figures, FIG. 1 depicts a flowchart 100 of a set of computer implemented operations for securely booting an operating system configuration selected from a set of operating system configurations using hardware and software, according to various embodiments. The operations of flowchart 100 can be executed by a computing system configured to securely boot applications, as described herein. In some embodiments, the computing system can be the computer 305 (FIG. 3) or the computing device 600 (FIG. 6). In certain embodiments, the computing system can include one or more computing nodes or computing devices. Various operations depicted in the flowchart 100 can be executed using software, firmware, and hardware components of the computing system. These components, including the computing system as whole, are collectively referred to herein as the computing system. Each operation shown in flowchart 100 can be executed automatically by the computing system or in response to one or more events (e.g., a user action or request).

The computing system can execute operation 105 to receive a request to boot an operating system configuration. The request can be received from a remote user interface terminal (e.g., a user interface terminal coupled to the computing system through, for example, data communications network). The request can also be received from a local user interface terminal (e.g., a user interface terminal physically connected to the computing system). A user submitting a request, or otherwise interacting with the computing system using a local user interface terminal is required to either be in the physical presence of the computing system, or to be in such close proximity to the computing system that he can be assumed to have physical possession of the computing system.

The computing system can execute operation 110 to store a digital key for authenticating the requested operating system configuration, as described herein. The digital key can be a public key of an asymmetric key pair, where the respective private key was used to sign the requested operating system configuration. In embodiments, the digital key can be stored in a nonvolatile memory. The nonvolatile memory can include, but is not limited to, persistent Random Access Memory (RAM), a FLASH memory, system storage. In some embodiments, the computing system can be configured to automatically check the nonvolatile memory for digital keys after restarting.

The computing system can execute operation 115 to restart the computing system. In some embodiments, the computing system can automatically restart in response to executing operation 110. In various embodiments, the computing system can restart in response to receiving a request to restart from a user interface terminal.

While the computing system is in a pre-boot state, the computing system can transmit a request to a user on a local user interface terminal to confirm the request to boot the requested operating system configuration. The computing system can then execute operation 120 to receive a signal, from the local user interface terminal, confirming the request to boot the requested operating system configuration. Executing operation 120 can ensure that a user requesting a change the operating system configuration booted on the computing system (e.g., a possible change to the access control policy enforcement, or security, level) has physical access to the computing system. This operation can limit the likelihood of an unauthorized user remotely changing the access control policy enforcement, or security, level of the computing system.

While still in the pre-boot state, the computing system can execute operation 125 to authenticate the requested operating system configuration using the digital key. The computing system can then execute operation 130 to boot the requested operating system configuration.

In some embodiments, the computing system can, in response to restarting, verify (e.g. validate) or determine that the digital key stored in operation 115 corresponds to an operating system configuration that is authorized to boot on the computing system. The verification can include determining whether an operating system configuration stored, and authorized to execute, on the computing system was signed by a private key corresponding to the digital key. The verification operation helps ensure the integrity of the pre-boot environment and of the booted system by ensuring that only known or approved configurations are considered for booting.

In some embodiments, the computing system can, in response to receiving the confirmation in operation 120, move the digital key to a protected memory. The storage system can, for example, move the digital key to a key database or repository that is writable only by specific trusted (e.g., secure or authenticated) applications. These embodiments can provide the benefit of leveraging the existing architecture of secure boot techniques to enable trusted applications to verify the validity and authenticity of the requested operating system configuration. This also enables the computing system to boot the requested operating system configuration after restarting, without requiring a user to have access to a local user interface terminal.

In some embodiments, the protected memory (e.g., the key database) is only writeable by a software application whose executable code integrity is authenticated by a hardware component (e.g., using digital keys stored in the protected memory) of the computing system. These embodiments can provide the benefit of enforcing the authenticity of the requested operating system configuration by limiting the number of parties that can add new, and possibly unauthorized, keys to the computing system.

In some embodiments, authenticating the requested operating system configuration includes retrieving the digital key from the protected memory and using the retrieved key to verify a signature of the requested operating system configuration. These embodiments can provide the benefit of leveraging existing architecture of secure boot techniques to ensure that an operating system configuration is not modified before the configuration is booted.

According to various embodiments, the operating system configuration requested in operation 105 can include an operating system kernel and a set of kernel parameter values for enforcing an access control policy enforcement, or security, level of the operating system kernel (e.g., an access control policy). In certain embodiments the set of kernel parameter values are compiled into the executable code of the operating system kernel, as described herein.

Figure 2:
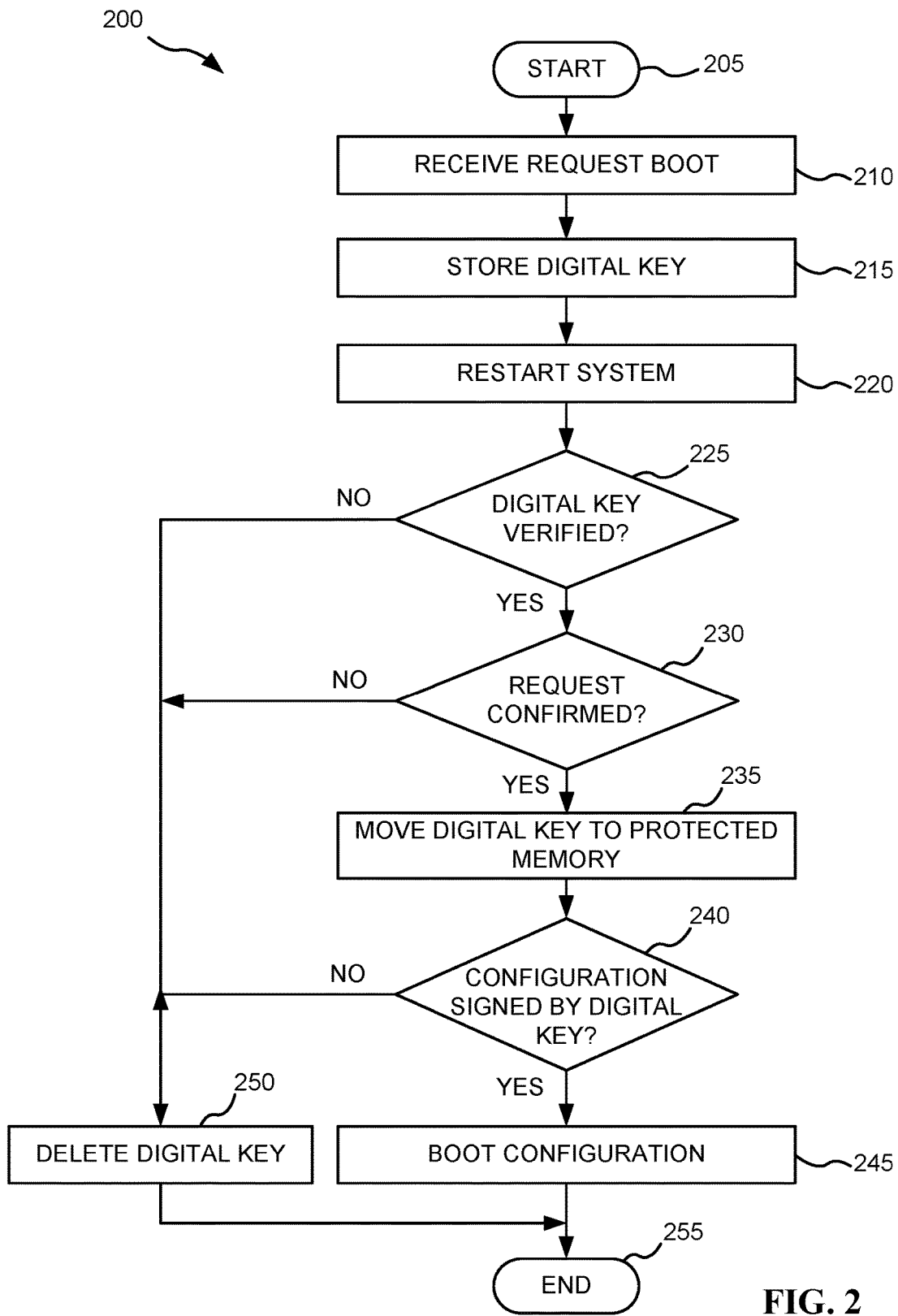
FIG. 2 depicts a flowchart of an example a set of computer implemented operations for securely booting an operating system configuration selected from a set of operating system configurations using hardware and software, according to various embodiments.

FIG. 2 depicts a flowchart 200 of an example a set of computer implemented operations for securely booting an operating system configuration selected from a set of operating system configurations using hardware and software, according to various embodiments. The operations of flowchart 200 can be executed by a computing system configured to securely boot applications, as described herein. Each operation shown in flowchart 200 can be executed automatically by the computing system or in response to one or more events (e.g., a user action or request).

The computing system can execute operation 205 by, for example, generating a set of operating system configurations that are able to boot on the computing system. The operating system configurations can include operating system kernels along with a set of kernel parameter values. The kernel parameter values can configure the access control policy enforcement level (or the security level) of an associated operating system kernel. Each configuration can additionally be digitally signed with, for example, a different private key of an asymmetric public-private key pair to ensure the executable code integrity of the operating system configuration. Public keys corresponding to each private key can also be stored on the computing system.

The computing system can execute operation 210 to receive a request to boot a selected operating system configuration (e.g., a boot request). The request can be received from a remote user interface terminal or a local user interface terminal, as described herein.

At operation 215, the computing system can store a digital key (e.g., a public key) associated with a private key that was used to sign the requested operating system configuration. The digital key can be stored in a nonvolatile memory of the computing system, as described herein. In some embodiments, the computing system can additionally update a configuration (e.g., a configuration file) of a bootloader to cause the bootloader to boot the requested operating system configuration the next time the computing system is restarted.

At operation 220, the computing system can restart (e.g., reboot). The computing system can then execute the following operations while the computing system is in a pre-boot state, as described herein.

At operation 225, the computing system can verify the digital key to determine whether the digital key corresponds to a known (e.g., stored) operating system configuration that is authorized to boot on the computing system, as described herein. The computing system can proceed to operation 230 when the public key is verified, or, alternatively, the computing system can proceed to operation 250 in response to determining that the requested operating system configuration cannot be verified.

At operation 230, the computing system can confirm the request to boot the requested operating system configuration. Executing operation 230 can include prompting the requesting user at a local user interface terminal to confirm the request to boot the requested operation system configuration. The computing system can then receive a confirmation signal or message from the local user interface terminal. The received confirmation signal can include any electronic signal, including an electrical voltage or a set of digital characters. The received confirmation signal can be a positive confirmation or a negative confirmation. The computing system can continue to operation 235 when the received confirmation signal is a positive confirmation, while the computing system can proceed to operation 250 when the received confirmation signal is a negative confirmation. Additionally, the computing system can, in response to receiving a positive confirmation, move the digital key to a protected memory (e.g., as an alternative to executing operation 235), as described herein.

At operation 235, the computing system can move the digital key to a protected memory of the computing system, as described herein. In some embodiments, the computing can execute operation 235 before executing operation 230.

At operation 240, the computing system can retrieve or read the digital key from the protected memory and use it to authenticate the requested operating system configuration, as described herein. Authenticating the requested operating system configuration can include determining that the requested operating system configuration was not modified after it was signed using a private key. The computing system can continue to operation 245 when the requested operating system configuration is authentic, while the computing system can continue to operation 250 when the requested operating system configuration is not authentic.

At operation 245, the computing system can boot the requested operating system configuration, as described herein. The computing system can end the operations of flowchart 200 at operation 255.

At operation 250, the computing system can delete or erase the digital key from nonvolatile memory and/or the protected memory. The computing system can then provide an indication that the requested operating system configuration cannot be booted. In some embodiments and in response to arriving at operation 250 from other operations (e.g., operation 225, 235, and 240), the computing system may not delete the private key. In these embodiments, the computing system can abort the boot process by providing an indication that the requested operating system configuration cannot be booted.

Figure 3:
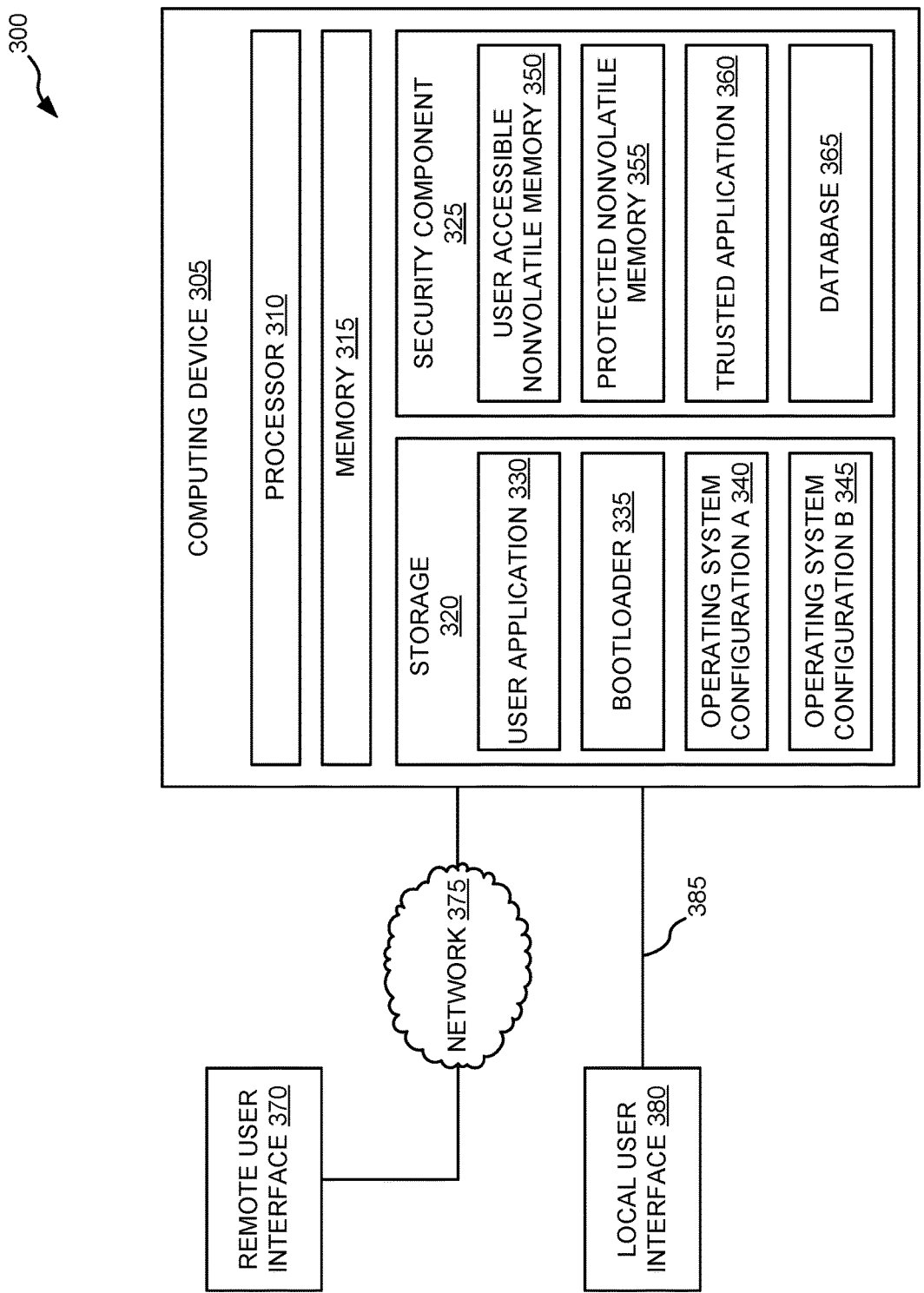
FIG. 3 depicts a block diagram of an example system for securely booting an operating system configuration selected from a set of operating system configurations using hardware and software, according to various embodiments.

FIG. 3 depicts a block diagram of an example system 300 for securely booting an operating system configuration selected from a set of operating system configurations using hardware and software, according to various embodiments. The system 300 can be a computing system configured execute the operations of the present disclosure, as described herein. The system 300 includes computing device 305 and local user interface 380 (e.g., a local user interface terminal). In some embodiments, the system 300 can include remote user interface 370 (e.g., a remote user interface terminal) and data communications network 375.

Computing device 305 can include processor 310, memory 315, storage 320 and security component 325. The computing device 305 can be a computing device configured to securely load a selected operating system configuration, as described herein. The processor 310 can execute applications, including a user application 330 and a trusted application 360, loaded into the memory 315.

The storage 320 can be a storage device such as the storage device 628 (FIG. 6). The storage 320 can store applications, including operating system configurations, for execution on the computing device 305. The storage device, for example, can store user application 330, bootloader 335, operating system configuration A 340 and operating system configuration B 345.

The user application 330 can be a software application executable by a user logged into the computing device 305. In some embodiments, the user application 330 can be substantially the same, and can execute the same operations, as the user application discussed in FIG. 4. The user application 330, for example, can be executed to enable a user to transmit a request to change an operating system configuration on the computing device 305. In some embodiment, the user application 330 can be executed to update the configuration of the bootloader 335, as described herein.

The bootloader 335 can be a software application authorized to execute on the computing device 305 to boot an operating system configuration such as the operating system configuration A 340 and the operating system configuration B 345. In some embodiments, the bootloader 335 can be signed by a private key of a public-private key pair to ensure the integrity of its executable code. After a restart of the computing device 305, the bootloader 335 can be executed by a trusted application (e.g., trusted application 360) to authenticate and boot, based on a configuration of the bootloader, a preselected operating system configuration.

The operating system configurations A 340 and the operating system configuration B 345 can be two distinct bootable operating system configurations stored on the computing device 305. Each operating system configuration can be signed, and can include an operating system kernel and a set of associated kernel parameter values, as described here. In some embodiments, the operating system configurations A 340 and operating system configuration B 345 can both have the same operating system kernel and different sets of kernel parameter values. In certain embodiments, operating system configurations A 340 and operating system configuration B 345 can have different operating system kernels and similar kernel parameter values (e.g., the kernel parameter values can ensure that each configuration is booted to have the same access policy enforcement level).

The security component 325 can include hardware and software components for ensuring the executable code integrity or authenticity of applications that boot on the computing device 305. In some embodiments, the security component 325 can include user accessible nonvolatile memory 350, protected nonvolatile memory 355, trusted application 360 and database 365. While shown as a separate component, all or part of the security component 325 can be included in one or more other components of the computing device 305.

The user accessible nonvolatile memory 350 can be any nonvolatile memory that is accessible for at least writing by an application executable by a user of the computing device 305, as described herein. The user accessible nonvolatile memory 355, for example, can be a battery backed random access memory, a flash memory, or an area on storage 320. In certain embodiments, the user accessible nonvolatile memory can serve as a staging area to temporarily store a public key corresponding to an operating system configuration selected to boot on the computing device 305, as described herein.

The protected nonvolatile memory 355 can be an area of nonvolatile memory that is accessible from only a select set of applications (e.g., trusted application 360 and bootloader 335). In some embodiments, the memory 355 can be written by only the trusted application 360 and only during a pre-boot state of the computing device 305. In certain embodiments, the protected nonvolatile memory 355 stores a set, or database, of verified public keys for authenticating applications that can boot on the computing device 305.

The trusted application 360 can be an application having executable code authenticated by the computing device 305 and configured to execute automatically when the computing device 305 restarts. In some embodiments, the trusted application 360 can be configured to automatically check for, and verify the validity of, new public keys stored at predetermined location of user accessible nonvolatile memory 350. The trusted application 360 can also be configured execute the operations of the trusted application discussed herein.

The database 365 can be repository of public keys for authenticating applications that can boot on the computing device 305. In some embodiments, the database 365 can be a part of protected nonvolatile memory 355. In certain embodiments, one or more public key stored in the database 365 can be written and digitally signed during the manufacture of computing device 305.

The local user interface 380 can be a user interface terminal configured to enable a user to execute input and output operations with respect to computing device 305. The local user interface 380 can be physically connected to computing device 305 by a connector (e.g., a data cable, a video cable, or other input-output cable or bus). According the various embodiments, the local user interface 380 can enable interaction between the trusted application 360 and a user in physical possession, or in the physical presence, of the computing device 305.

Figure 4:
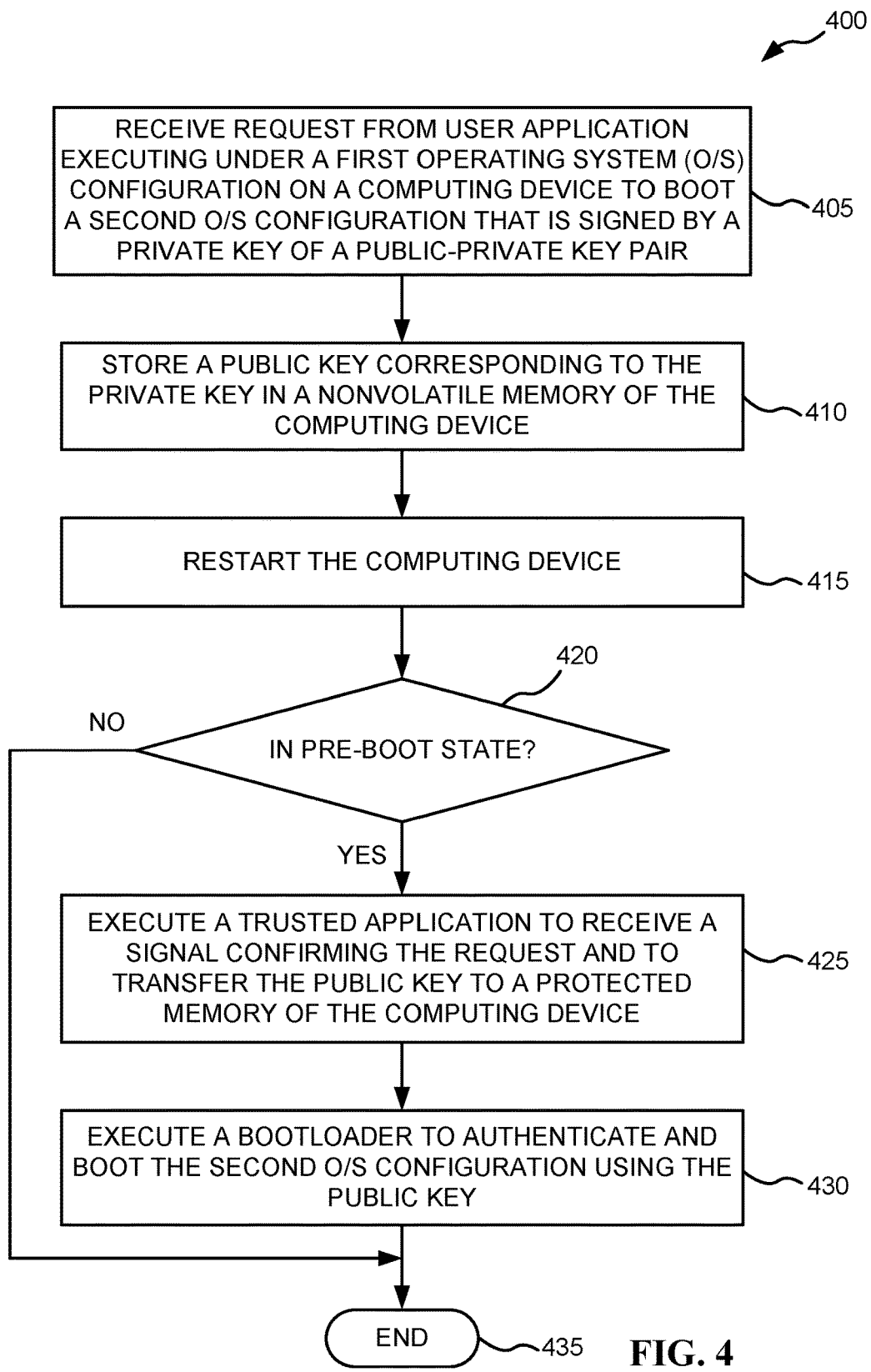
FIG. 4 depicts a flowchart of a set of computer implemented operations for securely booting a user's selection of an operating system configuration from a set of operating system configurations using hardware and software, according to various embodiments, according to various embodiments.

FIG. 4 depicts a flowchart 400 of a set of computer implemented operations for securely booting a user's selection of an operating system configuration from a set of operating system configurations using hardware and software, according to various embodiments. The operations of flowchart 400 can be executed by a computing device configured to securely boot applications, as described herein. Each operation shown in flowchart 400 can be executed automatically by the computing device or in response to one or more events (e.g., a user action or request).

At operation 405, the computing device can receive a request from user application executing under a first operating system configuration (O/S configuration A) to boot a second operating system configuration (O/S configuration B). The request can be received from any terminal or device that enables a user to access the computing device and execute the user application. In some embodiments, the user can access the computing device and execute the user application using a set of credentials (e.g., user name and a password associated with an authorized user account).

Operating system configuration B can include an operating system kernel having a set of kernel parameter values, as described herein. Operating system configuration B can be signed by a private key of a public-private key pair (e.g., an asymmetric key pair). In some embodiments, O/S configuration B can include the same operating system kernel as the operating system kernel included in O/S configuration A. O/S configuration B, however, can have a different set of kernel parameter values than the set of kernel parameter values included in O/S configuration A. Recalling the previously discussed operating system configuration example, both O/S configuration A and O/S configuration B can include a Linux kernel having an SELinux module. O/S configuration A, however, can include kernel parameter values to boot the Linux kernel with a high access control enforcement security level, while O/S configuration B can include kernel parameter values to boot the Linux kernel with a medium access control enforcement security level.

At operation 410 the computing device can store the public key corresponding to private key used to sign the O/S configuration B in a nonvolatile memory, as described herein. In some embodiments the user application or another application my cause the computing device to execute operation 410.

At operation 415, the computing device can restart. After restarting, the computing device can execute operations 425 and 430 while in a pre-boot state, consistent with operation 420.

At operation 425, the computing device can execute a trusted (e.g., secure or guaranteed to be unmodified) application to receive a signal confirming the request to boot O/S configuration B. In some embodiments, the trusted application can be substantially similar to the UEFI shim program. The computing system can be configured to automatically load, authenticate and execute the trusted application after the computing system restarts. The trusted application can be configured to read a specific area of nonvolatile memory (e.g., the area of nonvolatile memory written in operation 410) to determine if new public keys were added to the computing system. The trusted application can be further configured to, in response to detecting the new public key, verify that the public key corresponds to known operating system configuration (e.g., an operating system configuration authorized to boot on the computing system). In response to verifying the public key, the trusted application can copy, transfer, or move the public key to a protected memory of the computing device, as described herein. In some embodiments the protected memory is writeable only by the trusted application. Furthermore, the protected memory can be written only while the computing device is in a pre-boot state.

At operation 430, the computing device can execute a bootloader to authenticate and boot the O/S configuration B. In some embodiments, the trusted application can load, authenticate, and then execute the bootloader on the behalf of the computing system. The authenticated bootloader can read the public key from the protected memory and use it to authenticate O/S configuration B prior to booting. The bootloader can boot O/S configuration B when the authentication is successful, while the bootloader can abort the boot process when the authentication is not successful (e.g., when the bootloader detects that O/S configuration B was altered after being signed).

The operations of flowchart 400 can end at operation 435.

In some embodiments, the set of kernel parameter values in O/S configuration B determines software modules that are loadable while O/S configuration B is booted on the computing system. Additionally, in various embodiments, the set of parameter values can determine the enforcement of access control rights (e.g., the access control policy enforcement level) under O/S configuration B. These embodiments provide the advantage of ensure that the configuration, and the access control policies, of the computing system cannot be altered by a user using the computing system unless the user has physical access to the computing system and the integrity of an operating system configuration selected to change the computing system is authenticated, as described herein.

According to various embodiments, the protected nonvolatile memory is writeable only by a set of applications, including the trusted application, whose executable code integrity is authenticated by a hardware component of the computing system, as described herein. These embodiments provide the advantage of ensuring that unauthorized public keys cannot be added to the computing system. This in turn reduces the likelihood that unauthorized operating system configurations can booted on the computing system.

Figure 5:
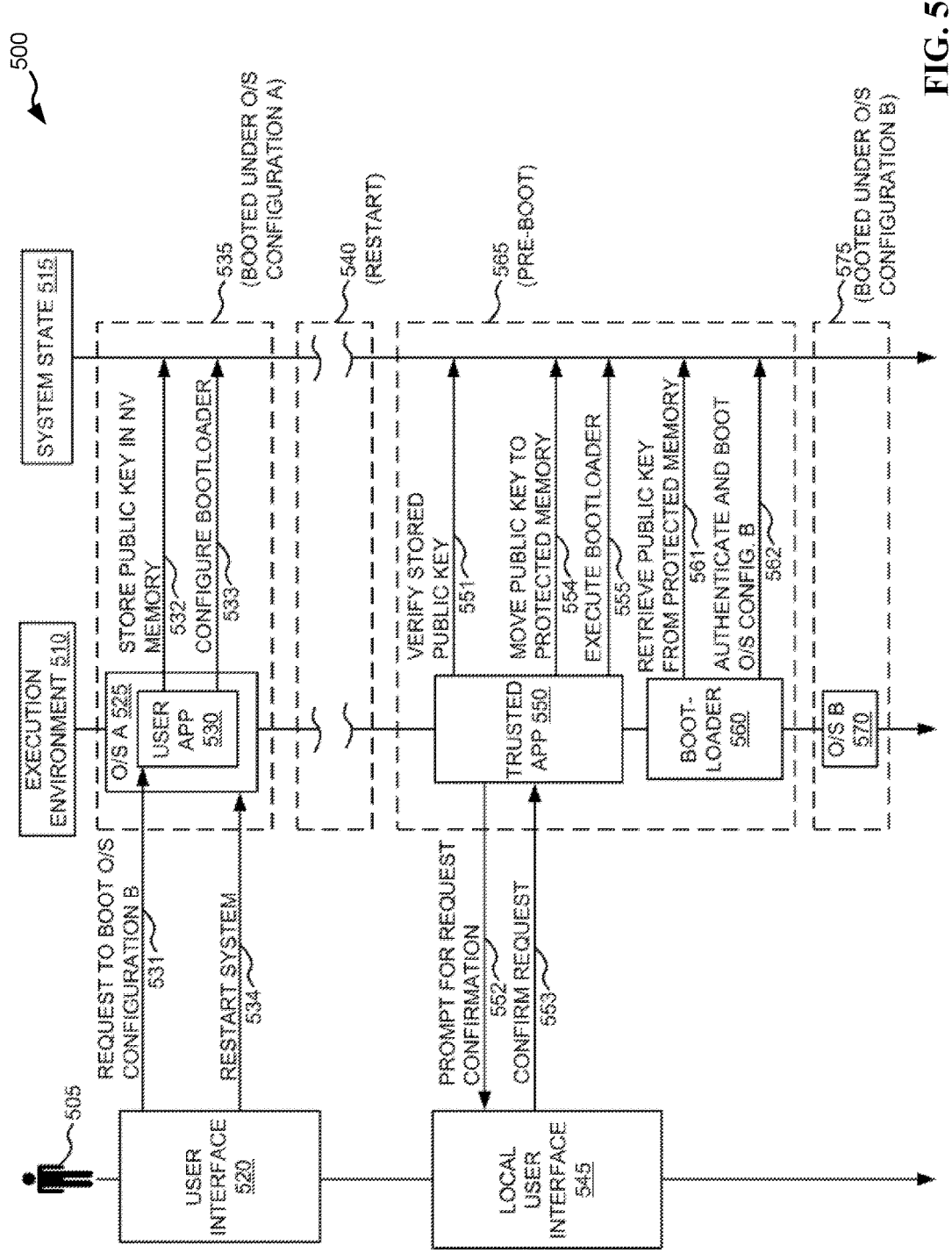
FIG. 5 depicts an interaction diagram of interactions between a user and a computing system executing a set of computer implemented operations for securely booting an operating system configuration selected from a set of operating system configurations using hardware and software, according to various embodiments.

FIG. 5 depicts an interaction diagram 500 of interactions between a user and a computing system executing a set of computer implemented operations for securely booting an operating system configuration selected from a set of operating system configurations using hardware and software, according to various embodiments. The interaction diagram 500 illustrates interactions between a user 505 and elements of a computing system configured to securely boot an operating system configuration, as described herein. Components of the interaction diagram include user 505, an execution environment 510 of the computing system, and system state 515 of the computing system. The execution environment 510 can be operating system configuration A 525 executing user application 530, trusted application 550, bootloader 560, and operating system configuration B 570. System state 515, as used in the context of FIG. 5, indicates the target of operations that either read or modify nonvolatile data stored on the computing device. The user 505 can interact with the execution environment 510 through a user interface 520 (e.g., a local or remote user interface terminal) or through local user interface 545 (e.g., while the user has physical access to the computing system).

The first set of interactions can be executed while operating system configuration A (O/S configuration A) is booted on the computing system, as shown by reference element 535.

According to various embodiments, the user application 530 can receive a request 531 to load operating system configuration B (O/S configuration B). The request 531 can be received from the user 505 through user interface 520. User application 530 can then execute a set of operations 532 to store a public key associated with a private used to sign O/S configuration B. The public key can be stored in a nonvolatile memory of the computing system. User application 530 can further execute operations 533 to update a configuration of the computing system's bootloader to boot O/S configuration B after the next restart of the computing system. The O/S configuration A can then receive a request 534 to restart the computing system.

The computing system can then restart, as shown by reference element 540.

The following interactions are executed while the computing system is in a pre-boot state, as shown by reference element 565.

According to various embodiments, a trusted application 550 executes operations 551 to retrieve the stored public key from the nonvolatile memory and verify (e.g., validate) that the retrieved public key corresponds to a known (e.g, valid) signed operating system configuration. The trusted application 550 can additionally execute operations 552 to prompt the user 505, through local user interface terminal 545, to confirm the request to boot O/S configuration B. The trusted application 550 can then execute operations 553 to receive a confirmation from the user 505. The trusted application can further execute operations 554 and 555 to move the public key to a protected memory and to authenticate and execute the bootloader 560. The bootloader 560 can execute operations 561 and 562 to retrieve the public key from protected memory and authenticate and boot O/S configuration B. In some embodiments, the bootloader 560 can cause trusted application 550 to execute operations 561 and 562 and upon successful authentication (or verification), boot O/S configuration B 570.

The computing system can then enter a booted state under O/S configuration B, as shown by reference element 575.

FIG. 6 depicts a block diagram of a computing device 600 having hardware and software components for securely booting an operating system configuration selected from a set of operating system configurations using hardware and software, according to various embodiments.

The components of the computing device 600 can include one or more processors 606, a memory 612, a terminal interface 618, a storage interface 620, an Input/Output ("I/O") device interface 622, and a network interface 624, all of which are communicatively coupled, directly or indirectly, for inter-component communication via a memory bus 610, an I/O bus 616, bus interface unit ("IF") 608, and an I/O bus interface unit 614.

The computing device 600 can include one or more general-purpose programmable central processing units (CPUs) 606A and 606B, herein generically referred to as the processor 606. In an embodiment, the computing device 600 can contain multiple processors; however, in another embodiment, the computing device 600 can alternatively be a single CPU device. Each processor 606 executes instructions stored in the memory 612.

The computing device 600 can include a bus interface unit 608 to handle communications among the processor 606, the memory 612, the display system 604, and the I/O bus interface unit 614. The I/O bus interface unit 614 can be coupled with the I/O bus 616 for transferring data to and from the various I/O units. The I/O bus interface unit 614 can communicate with multiple I/O interface units 618, 620, 622, and 624, which are also known as I/O processors (IOPs) or I/O adapters (IOAs), through the I/O bus 616. The display system 604 can include a display controller, a display memory, or both. The display controller can provide video, audio, or both types of data to a display device 602. The display memory can be a dedicated memory for buffering video data. The display system 604 can be coupled with a display device 602, such as a standalone display screen, computer monitor, television, a tablet or handheld device display, or another other displayable device. In an embodiment, the display device 602 can include one or more speakers for rendering audio. Alternatively, one or more speakers for rendering audio can be coupled with an I/O interface unit. In alternate embodiments, one or more functions provided by the display system 604 can be an on board integrated circuit that also includes the processor 606. In addition, one or more of the functions provided by the bus interface unit 608 can be an on board integrated circuit that also includes the processor 606.

The I/O interface units support communication with a variety of storage and I/O devices. For example, the terminal interface unit 618 supports the attachment of one or more user I/O devices, which can include user output devices (such as a video display device, speaker, and/or television set) and user input devices (such as a keyboard, mouse, keypad, touchpad, trackball, buttons, light pen, or other pointing devices). A user can manipulate the user input devices using a user interface, in order to provide input data and commands to the user I/O device 626 and the computing device 600, can receive output data via the user output devices. For example, a user interface can be presented via the user I/O device 626, such as displayed on a display device, played via a speaker, or printed via a printer.

The storage interface 620 supports the attachment of one or more disk drives or direct access storage devices 628 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 628 can be implemented via any type of secondary storage device. The contents of the memory 612, or any portion thereof, can be stored to and retrieved from the storage device 628 as needed. The I/O device interface 622 provides an interface to any of various other I/O devices or devices of other types, such as printers or fax machines. The network interface 624 provides one or more communication paths from the computing device 600 to other digital devices and computer systems.

Security component 631 can be substantially similar to, and include the same functions of, the security component 325 (FIG. 3). The security component 631 can include hardware and software components for ensuring the executable code integrity or authenticity of applications that boot on the computing device 600.

Although the computing device 600 shown in FIG. 6 illustrates a particular bus structure providing a direct communication path among the processors 606, the memory 612, the bus interface 608, the display system 604, and the I/O bus interface unit 614, in alternative embodiments the computing device 600 can include different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface unit 614 and the I/O bus 608 are shown as single respective units, the computing device 600, can include multiple I/O bus interface units 614 and/or multiple I/O buses 616. While multiple I/O interface units are shown, which separate the I/O bus 616 from various communication paths running to the various I/O devices, in other embodiments, some or all of the I/O devices are connected directly to one or more system I/O buses.

In various embodiments, the computing device 600 is a multi-user mainframe computer system, a single-user system, or a server computer or similar device that has little or no direct user interface, but receives requests from other computer systems (clients). In other embodiments, the computing device 600 can be implemented as a desktop computer, portable computer, laptop or notebook computer, tablet computer, pocket computer, telephone, smart phone, or any other suitable type of electronic device.

In an embodiment, the memory 612 can include a random-access semiconductor memory, storage device, or storage medium (either volatile or nonvolatile) for storing or encoding data and programs. In another embodiment, the memory 612 represents the entire virtual memory of the computing device 600, and can also include the virtual memory of other computer systems coupled to the computing device 600 or connected via a network 630. The memory 612 can be a single monolithic entity, but in other embodiments the memory 612 can include a hierarchy of caches and other memory devices. For example, memory can exist in multiple levels of caches, and these caches can be further divided by function, so that one cache holds instructions while another holds non-instruction data, which is used by the processor. Memory 612 can be further distributed and associated with different CPUs or sets of CPUs, as is known in any various so-called non-uniform memory access (NUMA) computer architectures.

The memory 612 can store all or a portion of the components and data shown in FIG. 1-5. In particular, one or more of a user application, trusted application, boot loader, and operating system configuration can be loaded from storage device 628 or security component 631 into memory 612 to be authenticated and executed to perform the operations described herein. The computer executable code can be executed by processor 606. Some or all of the components and data shown in FIGS. 1-5 can be on different computer systems and can be accessed remotely, e.g., via a network 630. The computing device 600 can use virtual addressing mechanisms that allow the programs of the computing device 600 to behave as if they only have access to a large, single storage entity instead of access to multiple, smaller storage entities. Thus, while the components and data shown in FIGS. 1-5 are illustrated as being included within the memory 612, these components and data are not necessarily all completely contained in the same storage device at the same time. Although the components and data shown in FIG. 1-5 are illustrated as being separate entities, in other embodiments some of them, portions of some of them, or all of them can be packaged together.

In an embodiment, the components and data shown in FIGS. 1-5 can include instructions or statements that execute on the processor 606 or instructions or statements that are interpreted by instructions or statements that execute the processor 606 to carry out the functions as further described below. In another embodiment, the components shown in FIGS. 1-5 can be implemented in hardware via semiconductor devices, chips, logical gates, circuits, circuit cards, and/or other physical hardware devices in lieu of, or in addition to, a processor-based system. In an embodiment, the components shown in FIGS. 1-5 can include data in addition to instructions or statements.

FIG. 6 is intended to depict representative components of the computing device 600. Individual components, however, can have greater complexity than represented in FIG. 6. In FIG. 6, components other than or in addition to those shown can be present, and the number, type, and configuration of such components can vary. Several particular examples of additional complexity or additional variations are disclosed herein; these are by way of example only and are not necessarily the only such variations. The various program components described as being included in FIG. 6 can be implemented, in various embodiments, in a number of different ways, including using various computer applications, routines, components, programs, objects, modules, data structures etc., which can be referred to herein as "software," "computer programs," or simply "programs."

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    receiving, in a booted state of a computing system, a request to load an operating system configuration;
    storing, automatically in response to receiving the request, a digital key to authenticate the operating system configuration;
    restarting the computing system;
    in response to restarting the computing system and while the computing system is in a pre-boot state:
    validating that the digital key stored is one for a valid operating system configuration;
    receiving, from a user interface physically coupled to the computing system, a signal confirming the received request;
    authenticating, in response to receiving the signal, the operating system configuration using the digital key; and
    booting, in response to the authenticating, the operating system configuration.

2. The method of claim 1, further comprising:
    determining, prior to the receiving, that the digital key corresponds to an operating system configuration that is authorized to boot on the computing system.

3. The method of claim 1, further comprising:
    moving, in response to receiving the confirmation signal, the digital key to a protected memory of the computing system, wherein the protected memory is writable only while the computing system is in a pre-boot state.

4. The method of claim 3, wherein the protected memory is writeable only by a software application having execution code integrity authenticated by a hardware component of the computing system.

5. The method of claim 3, wherein the authenticating includes retrieving the digital key from the protected memory and using the retrieved digital key to verify a digital signature of the operating system configuration.

6. The method of claim 1, wherein the operating system configuration comprises:
    an operating system kernel; and
    a set of parameters for enforcing an access control policy of the operating system kernel.

7. The method of claim 6, wherein the set of parameters are compiled into an executable code of the operating system kernel.

8. The method of claim 1, wherein:
    the operating system configuration is digitally signed by a private key of public-private key pair, and
    the digital key is a public key of the public-private key pair.

9. A system, comprising:
    a user interface terminal;
    a computing system physically coupled to the user interface terminal and having a memory and a processor; and
    a computer readable storage medium of the computing system having program instructions embodied therewith, the program instructions executable by the processor to cause the system to:
    receive, in a booted state of the computing system, a request to load an operating system configuration;
    store, automatically in response to receiving the request, a digital key to authenticate the operating system configuration;
    restart the computing system;
    in response to restarting the computing system and while the computing system is in a pre-boot state:

validate that the digital key stored is one for a valid operating system configuration;
receive, from a user interface physically coupled to the computing system, a signal confirming the received request;
authenticate, in response to receiving the signal, the operating system configuration using the digital key; and
boot, in response to the authenticating, the operating system configuration.

10. The method of system of claim 9, further comprising:
determine, prior to the receiving, that the digital key corresponds to an operating system configuration that is authorized to boot on the computing system.

11. The system of claim 9, wherein the program instructions are further executable by the processor to cause the system to:
move, in response to receiving the confirmation signal, the digital key to a protected memory of the computing system, wherein the protected memory is writable only while the computing system is in a pre-boot state.

12. The system of claim 11, wherein the protected memory is writeable only by a software application having execution code integrity authenticated by a hardware component of the computing system.

13. The system of claim 11, wherein the program instructions are further executable by the processor to cause the system to retrieve the digital key from the protected memory and using the retrieved digital key to verify a digital signature of the operating system configuration.

14. The system of claim 9, wherein the operating system configuration comprises:
an operating system kernel; and
a set of parameters for enforcing an access control policy of the operating system kernel.

15. The system of claim 14, wherein the set of parameters are compiled into an executable code of the operating system kernel.

16. The system of claim 9, wherein:
the operating system configuration is digitally signed by a private key of public-private key pair, and
the digital key is a public key of the public-private key pair.

17. A computer program product for securely booting a computing system, the computer program product including a computer readable storage medium having program instructions embodied therewith, wherein the computer readable storage medium is not a transitory signal per se, the program instructions executable by a processor to cause the computing system to execute a method comprising:
receiving, in a booted state of the computing system, a request to load an operating system configuration;
storing, automatically in response to receiving the request, a digital key to authenticate the operating system configuration;
restarting the computing system;
in response to restarting the computing system and while the computing system is in a pre-boot state:
validating that the digital key stored is one for a valid operating system configuration;
receiving, from a user interface physically coupled to the computing system, a signal confirming the received request;
authenticating, in response to receiving the signal, the operating system configuration using the digital key; and
booting, in response to the authenticating, the operating system configuration.

18. The computer program product of claim 17, further comprising:
determining, prior to the receiving, that the digital key corresponds to an operating system configuration that is authorized to boot on the computing system.

19. The computer program product of claim 17, wherein the method further comprises:
moving, in response to receiving the confirmation signal, the digital key to a protected memory of the computing system, wherein the protected memory is writable only while the computing system is in a pre-boot state.

20. The computer program product of claim 17, wherein the operating system configuration comprises:
an operating system kernel; and
a set of parameters for enforcing an access control policy of the operating system kernel.

* * * * *